(12) United States Patent
Fukuda et al.

(10) Patent No.: US 7,403,102 B2
(45) Date of Patent: Jul. 22, 2008

(54) OBSTACLE DETECTION APPARATUS

(75) Inventors: Mitsuhiro Fukuda, Niiza (JP);
Katsutoshi Yamashita, Niiza (JP);
Hisanobu Horimoto, Niiza (JP)

(73) Assignee: Honda Access Corporation, Saitama (JP)

( * ) Notice: Subject to any disclaimer, the term of this patent is extended or adjusted under 35 U.S.C. 154(b) by 194 days.

(21) Appl. No.: 11/227,171

(22) Filed: Sep. 16, 2005

(65) Prior Publication Data

US 2006/0103512 A1 May 18, 2006

(30) Foreign Application Priority Data

Nov. 16, 2004 (JP) .............................. 2004-332126

(51) Int. Cl.
*B60Q 1/00* (2006.01)
(52) U.S. Cl. ....................... 340/435; 340/903; 340/435; 701/301
(58) Field of Classification Search ................. 340/435, 340/436, 903, 70, 432.2; 367/93, 909; 342/70–72; 701/45–47; 180/281, 286
See application file for complete search history.

(56) References Cited

U.S. PATENT DOCUMENTS 6,268,803 B1 * 7/2001 Gunderson et al. .......... 340/903

2002/0030591 A1 3/2002 Paranjpe
2004/0167718 A1 * 8/2004 Hoenes et al. ............... 701/301
2005/0280518 A1 * 12/2005 Bartels et al. ................ 340/435

FOREIGN PATENT DOCUMENTS

| JP | 1-134605 | 5/1989 |
| JP | 6-242238 | 9/1994 |
| JP | 10-119675 | 5/1998 |
| JP | 2002-318282 | 10/2002 |

OTHER PUBLICATIONS

Office Action dated Jul. 9, 2007 issued in corresponding Canadian Application No. 2,520,065.
JPO Office Action in corresponding Japanese Appln. 2004-332126, issued Feb. 8, 2008.

* cited by examiner

*Primary Examiner*—Davetta W. Goins
*Assistant Examiner*—Ojiako Nwugo
(74) *Attorney, Agent, or Firm*—Westerman, Hattori, Daniels & Adrian, LLP.

(57) ABSTRACT

An obstacle detection apparatus detects an obstacle to a vehicle by a sensor section including a transmitter which transmits a wave to a predetermined detection area, and a receiver which receives an echo of the wave reflected by the obstacle. The obstacle detection apparatus measures a distance to the obstacle from the output of the sensor section. A detection-distance change circuit changes predetermined detection distances in the maximum detection distance. Alarm means gives an alarm step by step in accordance with the detection distances.

5 Claims, 6 Drawing Sheets

(a)

(b)

(a)

(b)

OBSTACLE DETECTION APPARATUS

BACKGROUND OF THE INVENTION

1. Field of the Invention

The present invention relates to an obstacle detection apparatus which prevents the collision of a vehicle.

2. Description of the Related Art

Conventionally, there has been proposed an obstacle detection apparatus which detects presence of on obstacle behind a vehicle and informs a person in the vehicle with an alarm. The obstacle detection apparatus has an ultrasonic sensor on a rear bumper of a vehicle, and receives an echo of the ultrasonic wave emitted from that sensor, hit on and reflected by the obstacle, thereby detecting the obstacle behind the vehicle from that echo.

In a four-wheel drive vehicle, however, when an openable/closable body like a tailgate is opened, or when a tire, a ski carrier, etc. are placed at the rear of the vehicle, the distance from the ultrasonic sensor to the obstacle differs from the distance from the rearmost part of the vehicle to the obstacle. This raises a problem that the vehicle has already come closer to the obstacle than is realized by the person in the vehicle, at the time the obstacle is detected by the ultrasonic sensor.

To resolve such a problem, Japanese Unexamined Patent Publication No. 2002-318282 (Patent Literature 1) discloses an obstacle detection apparatus which changes the maximum detection distance of a sensor section, or, specifically, increases the maximum detection distance in accordance with a distance between an ultrasonic sensor and the rearmost part of a vehicle, thereby informing presence of an obstacle early to allow a driver to maneuver the vehicle to avoid the obstacle. Japanese Unexamined Patent Publication No. 6-242238 (Patent Literature 2) discloses a vehicular obstacle detection apparatus which corrects the distance from a sensor section to an obstacle to a proper value for avoiding the obstacle.

According to the technology of Patent Literature 1, a person in a vehicle (driver) backs the vehicle while usually checking the distance to the obstacle. When that distance becomes a shorter, or, when an alarm starts beeping because of the detection of presence of the obstacle in the maximum detection distance, the driver carefully backs the vehicle with the help of that beeping alarm, thereby avoiding a collision with the obstacle. However, in a case where there is a difference between the distance from the ultrasonic sensor to the obstacle and the distance from the rearmost part of the vehicle to the obstacle, when the maximum detection distance changes, the alarm starts beeping at a point where the obstacle is yet sufficiently away from the rearmost part of the vehicle. Accordingly, the driver may feel awkward, and may have to pay unnecessary attention. According to the technology of Patent Literature 2, the distance from the detector to the obstacle is corrected for avoiding the collision of a bumper with the obstacle. Because the alarm sound is constant, however, the driver cannot know how close to the obstacle the vehicle has come from that alarm sound.

The invention has been made in view of the above-described problems. It is an object of the invention to provide an obstacle detection apparatus which can accurately inform a person in a vehicle of the distance to an obstacle without giving awkward feeling to the person in the vehicle.

SUMMARY OF THE INVENTION

To achieve the object, according to the first aspect of the invention, an obstacle detection apparatus for detecting an obstacle to a vehicle comprises: a sensor section including a transmitter which transmits a wave to a predetermined detection area, and a receiver which receives an echo of the wave reflected by the obstacle; a detection section which detects presence of the obstacle from an output of the sensor section; and a detection-distance change section which changes a predetermined detection distance within a maximum detection distance.

In the obstacle detection apparatus, the detection-distance change section may be switched over in conjunction with opening and closing of an openable/closable body provided at a rear portion of the vehicle.

The detection-distance change section may change the detection distance in accordance with a difference between a distance from the sensor section to the obstacle and a distance from a rearmost part of the vehicle to the obstacle.

The obstacle detection apparatus may further comprise alarm means for giving an alarm step by step in accordance with the detection distance.

The detection-distance change section may be turned on/off by a first switch which is operated by a person in the vehicle.

The detection-distance change section may adjust the detection distance as a person in the vehicle operates an adjust knob.

The detection-distance change section may change the detection distance upon shift of a shift lever to a reverse range.

The obstacle detection apparatus of the invention can allow the detection-distance change section to change the detection distance to the obstacle. The obstacle detection apparatus can also accurately inform the person in the vehicle of the distance to the obstacle without changing the maximum detection distance even if the distance from the sensor section to the obstacle differs from the distance from the rearmost part of the vehicle to the obstacle such as a case where the openable/closable body open. Therefore, the obstacle detection apparatus does not give awkward feeling to the person in the vehicle.

BRIEF DESCRIPTION OF THE DRAWINGS

The object, other objects, and advantages of the invention will be readily more apparent upon reading of the following detailed description together with the accompanying drawings in which.

DETAILED DESCRIPTION OF THE PREFERRED EMBODIMENT

Figure 2:
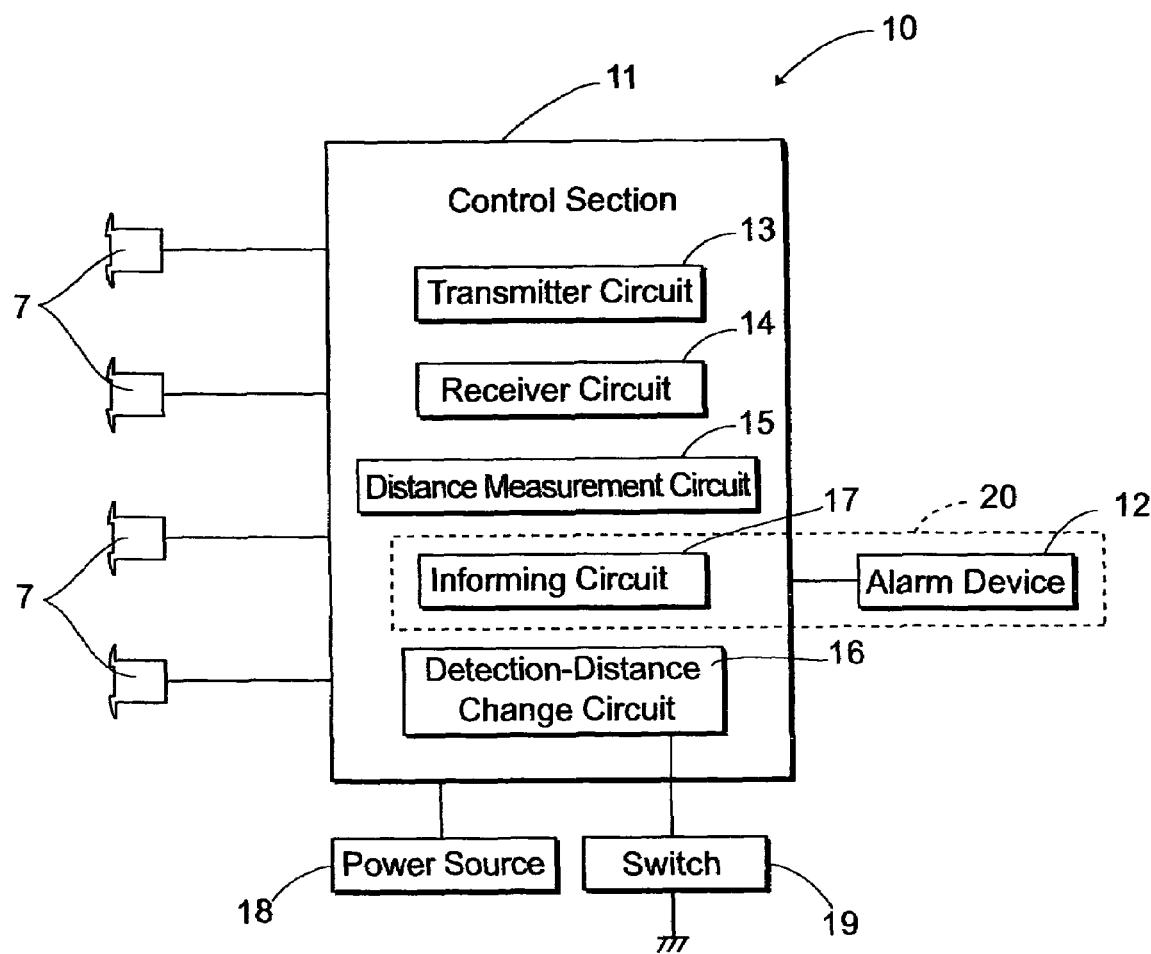
FIG. 2 is a block diagram illustrating the structure of the obstacle detection apparatus according to the embodiment.
Figure 3:
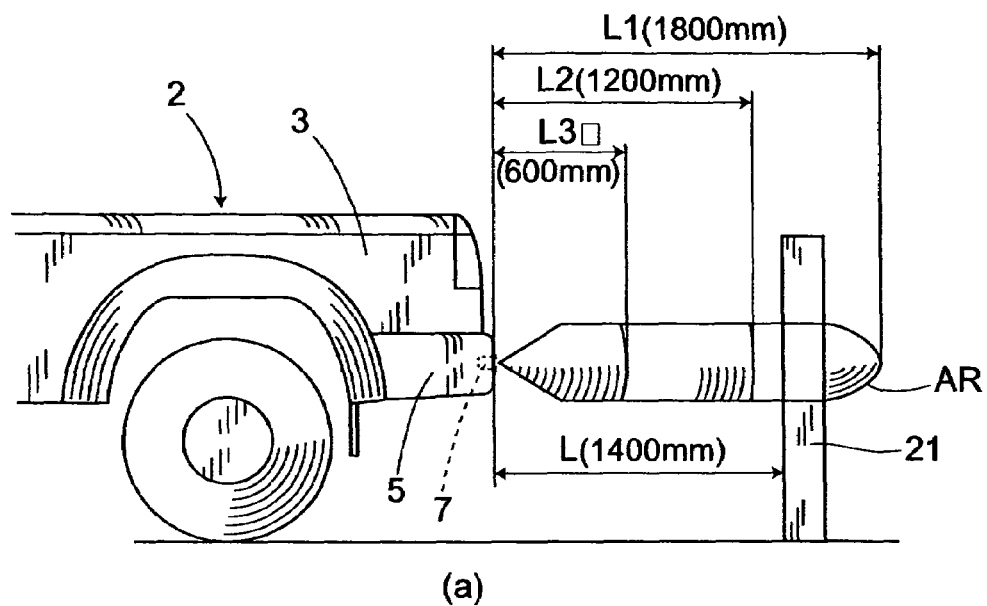
FIGS. 3A and 3B are side views of the rear portion of the vehicle exemplarily illustrating the relationship between a sensor section and the rearmost part of the vehicle according to the embodiment.
Figure 3:
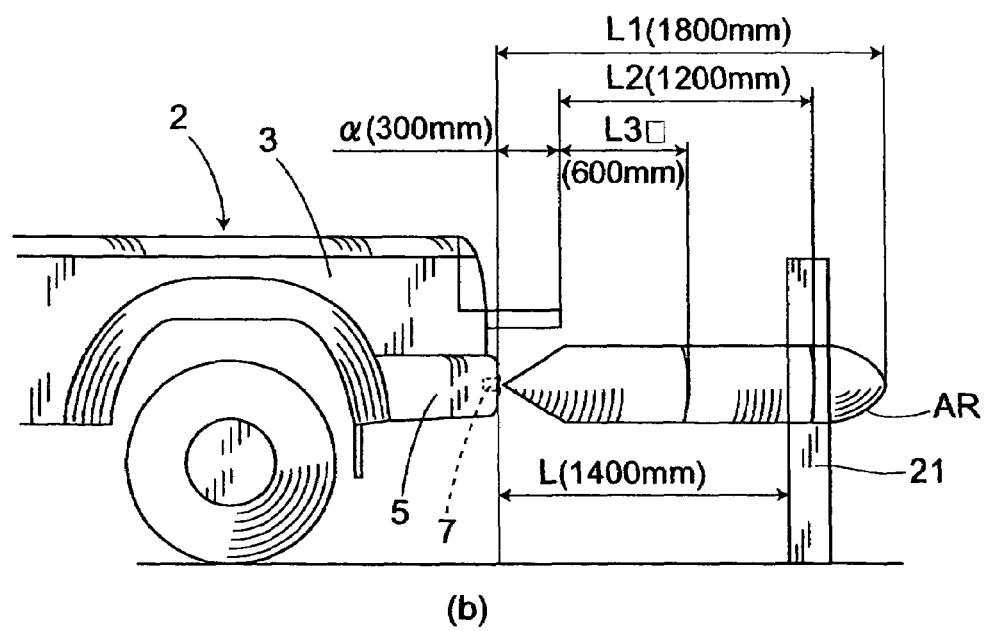
Figure 4:
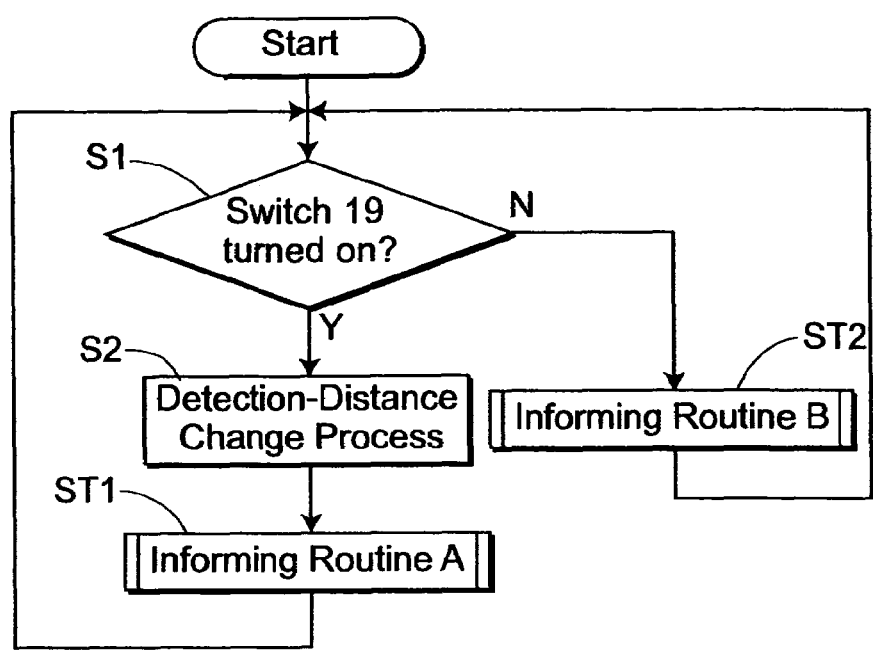
FIG. 4 is a flowchart illustrating a main flow of the embodiment.
Figure 5:
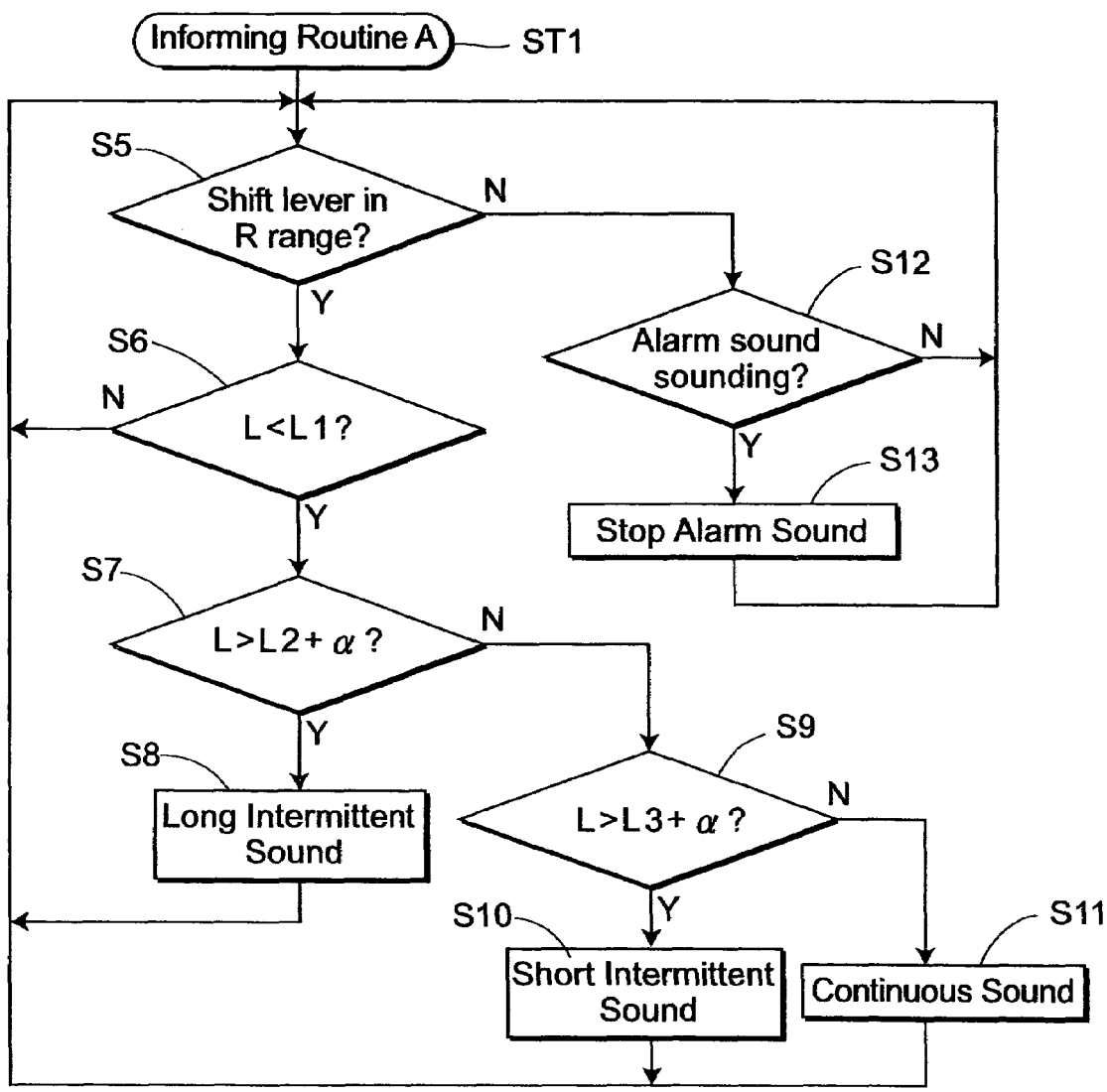
FIG. 5 is a flowchart illustrating an informing routine A of the embodiment.
Figure 6:
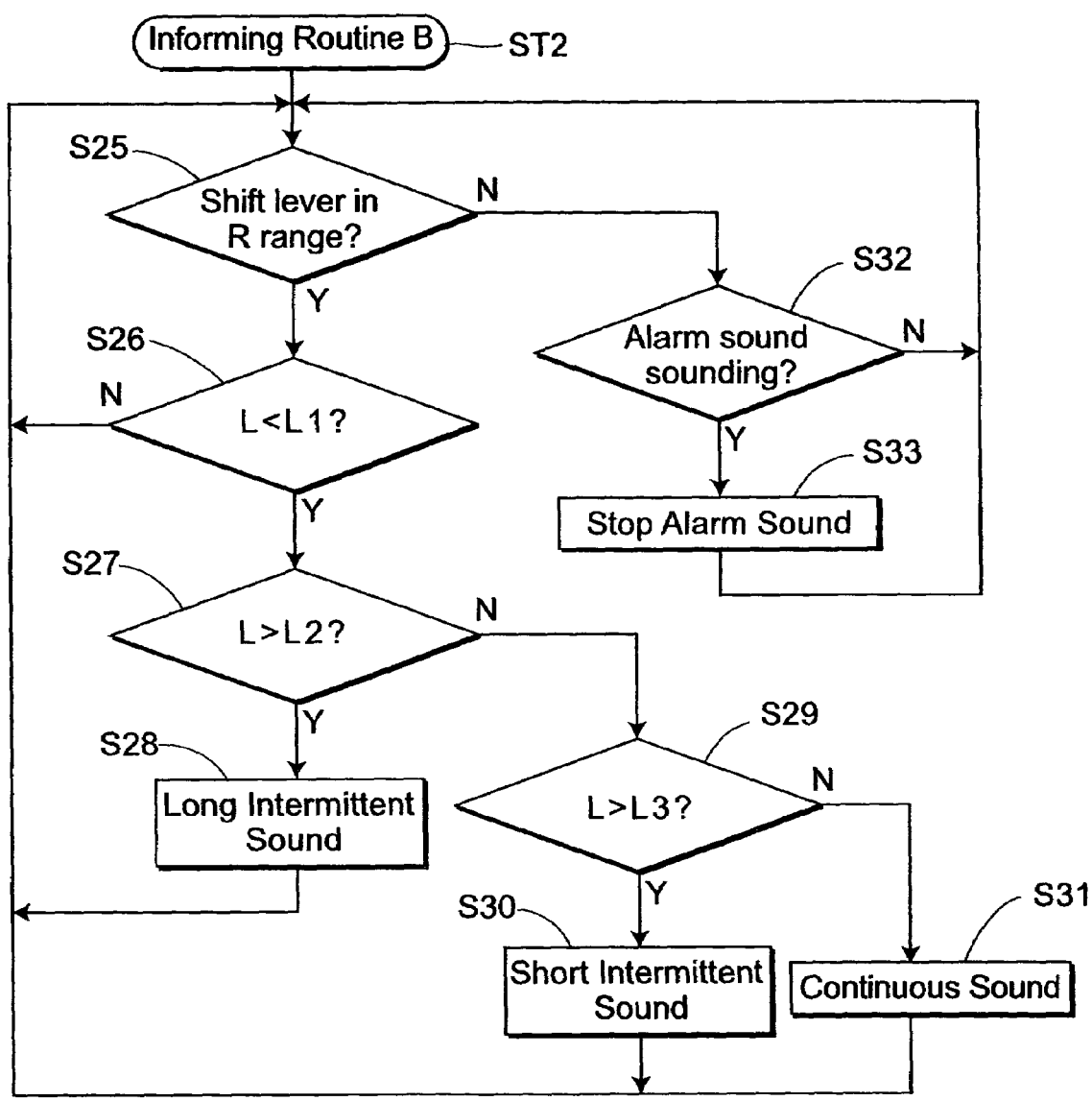
FIG. 6 is a flowchart illustrating an informing routine B of the embodiment.

A preferred embodiment of the invention will now be explained with reference to the accompanying drawings. FIGS. 1A and 1B are perspective views of a vehicle with an obstacle detection apparatus according to one embodiment of the invention. FIG. 1A illustrates a tailgate closed, while FIG. 1B illustrates the tailgate opened. FIG. 2 is a block diagram illustrating the structure of the obstacle detection apparatus. FIGS. 3A and 3B are side views of the rear portion of the vehicle exemplarily illustrating the relationship between a sensor section and the rearmost part of the vehicle. FIG. 4 is a flowchart illustrating a main flow. FIG. 5 is a flowchart illustrating an informing routine A. FIG. 6 is a flowchart illustrating an informing routine B.

Figure 1:
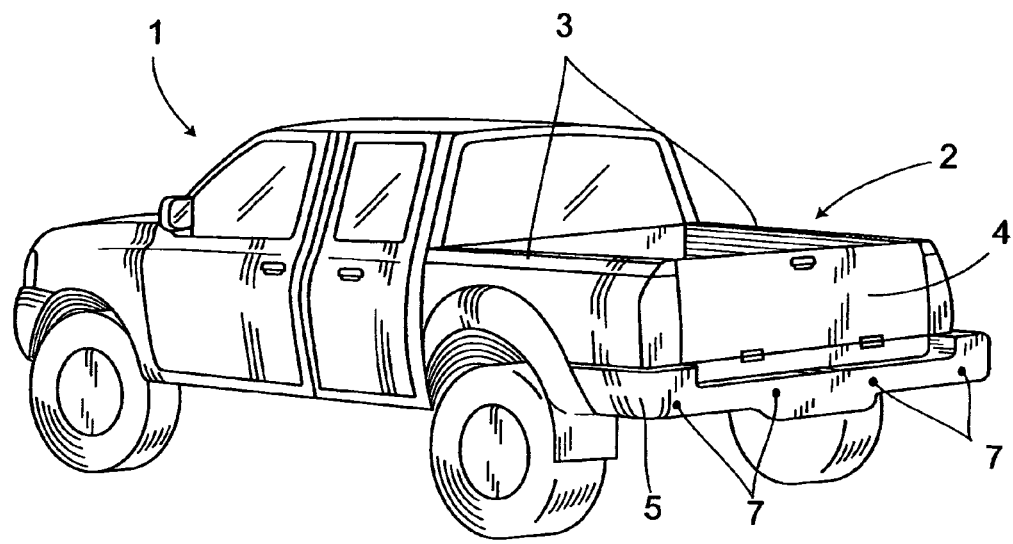
FIGS. 1A and 1B are perspective views of a vehicle with an obstacle detection apparatus according to one embodiment of the invention, FIG. 1A illustrating a tailgate closed, while FIG. 1B illustrating the tailgate opened.
Figure 1:
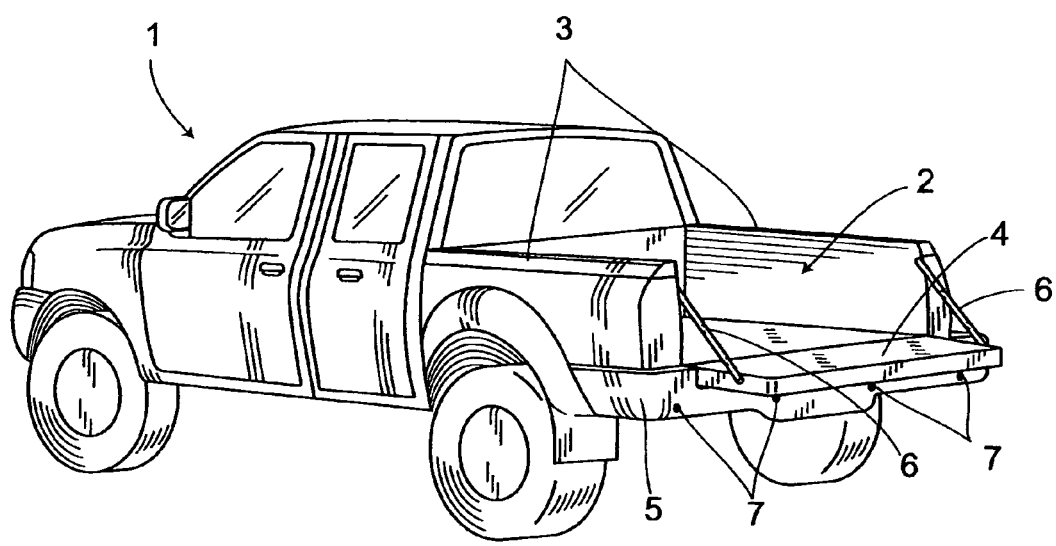

The vehicle 1 illustrated in FIG. 1 is a four-wheel drive vehicle, and provided with a bed 2 on the rear. The bed 2 has a pair of sidewall bodies 3, and a tailgate 4 as an openable/closable body. The tailgate 4 is rotatably supported at its lower portion to the bed 2. Accordingly, the tailgate 4 stands upright and engages with the sidewall bodies 3 to be in a closed state (FIG. 1A). The tailgate 4 tilts rearward and is held horizontally to be in an open state (FIG. 1B). In the open condition, therefore, the tailgate 4 sticks rearward out of a rear bumper 5. The tailgate 4 is horizontally supported by a pair of support bodies 6 in the open state. A plurality of sensor sections 7 are placed at the rear bumper at predetermined intervals, and electrically connected to a control section 11 to be discussed later.

The obstacle detection apparatus 10 illustrated in FIG. 2 comprises the control section 11, the sensor section 7 provided on the input side of the control section 11, and an alarm device 12 provided on the output side of the control section 11. The control section 11 comprises a transmitter circuit 13 which generates a wave like an ultrasonic wave to be emitted from the sensor section 7, a receiver circuit 14 which converts an echo of the wave, emitted from the sensor section 7 and reflected by an obstacle, to an electronic signal, a detection section to be discussed later which detects presence of the obstacle from the electronic signal converted by the receiver circuit 14, a detection-distance change circuit 16 as a detection-distance change section which changes detection distances within the maximum detection distance, and an informing circuit 17 as an informing section which compares the distance to the obstacle with a predetermined detection distance to determine alarm sounds. The control section 11 is connected to a power source 18, and a switch 19 which switches over the detection-distance change circuit 16.

The sensor section 7 includes a transmitter which emits the wave generated by the transmitter circuit 13 to a detection area AR behind the vehicle as illustrated in FIGS. 3A and 3B, and a receiver which receives the echo of the wave, emitted from the transmitter, hit on and reflected by the obstacle, and outputs it to the receiver circuit 14. Alarm means 20 comprises the alarm device 12 and the informing circuit 17. The alarm device 12 emits the alarm sounds like buzzers to inform a person in the vehicle of presence of the obstacle. The alarm sounds from the alarm device 12, alarm sounds differ from one another step by step, such as a long intermittent sound, a short intermittent sound, and a continuous sound, and are associated with different predetermined detection distances.

The detection section has a function to detect whether or not the obstacle is present in the detection distance from the echo. To be more precise, the detection section is a distance measurement circuit 15 which has a function to measure the distance from the sensor section 7 to the obstacle 21 from the echo received by the sensor section 7. The distance measurement circuit 15 measures the distance to the obstacle 21 based on the electronic signal converted by the receiver circuit 14 in accordance with a prestored non-illustrated program.

The informing circuit 17 determines whether a distance L to the obstacle 21 measured by the distance measurement circuit 15 corresponds to any one of the detection distances L1, L2, and L3 illustrated in FIGS. 3A, and 3B. The informing circuit 17 instructs the alarm device 12 to emit the alarm sound associated with that detection distance. The switch 19 is for switching over the detection-distance change circuit 16 for changing the detection distance, and it is not illustrated but the switch 19 comprises a first switch placed at a location for easier operation by the person in the vehicle, and a second switch provided at an openable/closable mechanism of the tailgate. The first switch is manually switched on/off by the person in the vehicle. The person in the vehicle mainly switches the first switch on/off when there is regularly a difference between the distance from the sensor section 7 to the obstacle 21 and the distance from the rearmost part of the vehicle 1 to the obstacle 21 as in a case where the vehicle 1 equips a tire, a ski carrier and the like on its rear. The second switch is switched on/off in conjunction with opening/closing of the tailgate 4, and preset as being switched off in the closed state and switched on in the open state. The second switch can certainly activate or stop the detection-distance change circuit 16 even if the person in the vehicle forgets to switch over the switch 19 mainly when the difference between the distance from the sensor section 7 to the obstacle 21 temporarily differs from the distance from the rearmost part of the vehicle 1 to the obstacle 21 such as a case where the person in the vehicle backs up the vehicle 1 with the tailgate 4 open at the time of loading and unloading a load. The switch 19 is normally turned off, and grounded when turned on.

The detection-distance change circuit 16 changes the detection distance in accordance with the difference between the distance from the sensor section 7 to the obstacle 21 and the distance from the rearmost part of the vehicle 1 and the obstacle 21 as illustrated in FIG. 3B. That is, the detection-distance change circuit 16 adds the difference a between the distance from the sensor section 7 to the obstacle 21 and the distance from the rearmost part of the vehicle 1 and the obstacle 21, to the predetermined distance, and outputs the result to the informing circuit 17. In detail, when the tailgate 4 is closed (FIG. 3A), the maximum detection distance L1, and the detection distances L2 and L3 in the maximum detection distance L1 are predetermined rearward with the sensor section 7 being the base point. When the switch 19 is switched on, the detection-distance change circuit 16 is activated, the maximum detection distance L1 remains as it is, and the distance a from the sensor section to the rearmost part of the vehicle 1 is added to the detection distances L2 and L3, so that the base point is shifted rearward by the distance equal to the height of the tailgate 4 (FIG. 3B). Accordingly, the detection distances L2 and L3 can be changed without changing the maximum detection distance L1. This results in generation of an appropriate alarm sound according to the actual distance between the rearmost part of the vehicle 1 and the obstacle 21 to prevent the rearmost part of the vehicle 1 from colliding against the obstacle 21 without giving awkward feeling to the person in the vehicle even if the tailgate 4 is open. A plurality of distances a to be added to the detection distances L2 and L3 by the detection-distance change circuit 16 are set in accordance with the lengths of the accessories such as a tire, and a ski carrier attached to the rearmost part of the vehicle 1, or the distance a is variable. The distance $\alpha$ is selected or adjusted by the operation of a non-illustrated adjust knob by the person in the vehicle. When the tailgate 4 is opened to activate the detection-distance change circuit 16, the distance a equal to the height of the tailgate 4 may be alternatively added.

Next, the operation of the above-described structure will be explained with reference to FIG. 4. FIG. 4 is a main flowchart illustrating the control operation of the control section 11.

First, the control section 11 determines whether or not the first switch is manually switched on by the person in the vehicle, or whether or not the second switch is switched on by opening of the tailgate 4 (step S1). When the determination is "YES", the flow proceeds to step S2, and a detection-distance change process is executed. By the detection-distance change process, the distance difference α to be added to the detection distances L2 and L3 is output to the informing circuit 17. The distance difference α a is a predetermined value like the height of the tailgate 4 or the length of the tire or the ski carrier attached to the tailgate 4, and it is a value which corresponds to the difference between the distance from the sensor section 7 to the obstacle 21 and the distance from the rearmost part of the vehicle 1 to the obstacle 21. The distance difference α is output to the informing circuit 17 in such a manner, and the flow proceeds to an informing routine A (step ST1). When the determination at the step S1 is "NO", the flow immediately goes to an informing routine B (step ST2).

FIG. 5 is a flowchart illustrating the informing routine A at the step ST1. An explanation will now be given of a case where the detection-distance change process is carried out with L1=1800 mm, L2=1200 mm, L3=600 mm, and α=300 mm as references. First, the informing circuit 17 determines whether or not a non-illustrated shift lever is in the reverse range (hereinafter, R range) (step S5). When the determination is "YES", that is, when determining that the person in the vehicle (driver) is trying to back the vehicle 1, the informing circuit 17 determines whether or not the distance L to the obstacle 21 measured from the output of the distance measurement circuit 15 is smaller than the detection distance L1 (1800 mm) (step S6). When the determination is "YES", the flow proceeds to step S7, while the determination is "NO", the flow returns to the step S5. The informing circuit 17 further determines whether or not the distance L to the obstacle 21 is larger than the detection distance L2+α(1200 mm+300 mm=1500 mm) (step S7). When determining as "YES", that is, when recognizing that the obstacle 21 is present within the range of L1 (1800 mm)>L>12+α(1500 mm), the informing circuit 17 instructs the alarm device 12 to sound the alarm sound corresponding to that detection distance (step S8). The alarm device 12 sounds the corresponding alarm sound, for example, the long intermittent sound to inform the person in the vehicle of presence of the obstacle 21 in the range of less than 1500 mm from the rearmost part of the vehicle 1, and greater than or equal to 1200 mm away therefrom. The flow returns to the step S5. When the determination at the step S7 is "NO", that is, when it is determined that the obstacle 21 is present in the range of L<L2+α(1500 mm), the flow returns to the step S9. The informing circuit 17 determines whether or not the distance L to the obstacle 21 is larger than the detection distance L3+α(600 mm+300 mm=900 mm) (step S9). When determining as "YES", that is, when recognizing that the obstacle 21 is present in the rage of L2+α(1500 mm)>L>L3+α(900 mm), the informing circuit 17 instructs the alarm device 12 to sound the alarm sound corresponding to that detection distance (step S10). The alarm device 12 sound the corresponding alarm sound, for example, the short intermittent sound to inform the person in the vehicle of approach of the obstacle 21 in the range of less than 1200 mm from the rearmost part of the vehicle 1, and more than or equal to 600 mm away therefrom. The flow returns to the step S5. When the determination at the step S9 is "NO", that is, when the informing circuit 17 determines that the obstacle 21 is present in the range of L<L3+α (900 mm), the flow proceeds to the step S11, the informing circuit 17 instructs the alarm device 12 to sound the alarm sound corresponding to that detection distance (step S11). The alarm device 12 sounds the corresponding alarm sound, for example, the continuous sound to inform the person in the vehicle of approach of the obstacle 21 in the range of less than 600 mm from the rearmost part of the vehicle 1.

When the determination at the step S5 is "NO", the flow proceeds to step S12, the informing circuit 17 determines whether or not the alarm sound is sounding (step S12). When determining as "YES", the informing circuit 17 allows the alarm device 12 to stop the alarm sound (step S13), and the flow returns to the step S5. In contrast, when the determination is "NO", the flow immediately returns to the step S5.

FIG. 6 is a flowchart illustrating the informing routine B. Only the difference of the informing routine B from the informing routine A is that the detection distance is constant, and, the informing routine B corresponds to a case where α in the informing routine A is equal to zero. Accordingly, an explanation will be appropriately omitted for easier understanding. L1, L2, and L3 are set as L1=1800 mm, L2=1200 mm, and L3=600 mm as references as well as in the above-described case. At step S27 corresponding to the step S7, the informing circuit 17 determines whether or not the distance L to the obstacle 21 is larger than the detection distance L2 (1200 mm). When determining as "YES", that is, when recognizing that the obstacle 21 is present in the range of L1 (1800 mm)>L>L2 (1200 mm), the informing circuit 17 instructs the alarm device 12 to sound the alarm sound corresponding to that detection distance (step S28), and the flow returns to the step S25. When the determining is "NO", that is, when the informing circuit 17 determines that the obstacle 21 is present in the range of L<L2 (1200 mm), the flow proceeds to step S29 which corresponds to the step S9. At the step S29, the informing circuit 17 determines whether or not the distance L to the obstacle 21 is larger than the detection distance L3 (600 mm). When determining as "YES", that is, when recognizing that the obstacle 21 is present in the range of L2 (1200 mm)>L>L3 (600 mm), the informing circuit 17 instructs the alarm device 12 to sound the alarm sound corresponding to the detection distance (step S30), and the flow returns to the step S25. When the determining is "NO" at the step S29, that is, when the informing circuit 17 determines that the obstacle 21 is present in the range of L<L3 (600 mm), the flow proceeds to the step S31 which corresponds to the step S11, and, the informing circuit 17 instructs the alarm device 12 to sound the alarm sound corresponding to that detection distance.

As explained above, for example, in a case where the obstacle 21 is present at the point 1400 mm away rearward from the rear bumper 5, that is, the sensor section 7, and the detection-distance change process is not carried out, because the detection distance L2 is 1200 mm from the sensor section 7, and the detection distance L3 is 600 mm from the sensor section 7, the informing circuit 17 recognizes that the obstacle 21 is present in between the maximum detection distance L1 (1800 mm) and the detection distance L2 (1200 mm) (FIG. 3A). In this case, with the tailgate 4 open, and the actual distance between the obstacle 21 and the vehicle 1 being 1100 mm, the long intermittent sound is generated even if the obstacle 21 actually is present in between the detection distance L2 and the detection distance L3. In contrast, when the detection-distance change process is carried out, the base points of those distances L2, and L3 are shifted rearward by 300 mm, the detection distance L2 is set as 1500 mm from the sensor section 7, and the detection distance L3 is set as 900 mm from the sensor section 7. Accordingly, the informing circuit 17 recognizes that the obstacle 21 is present in between the distance L2 (1500 mm) and the distance L3 (900 mm), and appropriately allows the alarm device 12 to generate the short intermittent sound, thereby urging the person in the vehicle to pay an appropriate attention in the early stages (FIG. 3B).

As mentioned above, the change of the detection distance by the detection-distance change circuit 16 causes the informing circuit 17 to recognize presence of the obstacle 21 in the ranges of L2 and L3 earlier than an ordinary practice by the distance α. Accordingly, in a case where there is the distance difference α between the distance from the sensor 7 to the obstacle 21 and the distance from the rearmost part of the vehicle 1 to the obstacle 21 such as a case where the tailgate 4 open, the collision of the vehicle 1 against the obstacle 21 can be certainly avoided. As the detection-distance change circuit 16 keeps the maximum detection distance L1 constant, the person in the vehicle does not feel awkward, and, the person in the vehicle does need not pay an unnecessary attention when there is a sufficient distance from the obstacle 21. This results in a further improvement of the usability.

As explained above, according to the embodiment, the obstacle detection apparatus 10 for detecting the obstacle 21 to a vehicle 1, comprises the sensor section 7 including a transmitter which transmits a wave to a predetermined detection area, and a receiver which receives an echo of the wave reflected by the obstacle 21, the distance detection circuit 15 which detects presence of the obstacle 21 from the output of the sensor section; and the detection-distance change circuit 16 which changes the predetermined detection distances L2 and L3 within the maximum detection distance L1. The obstacle detection apparatus 10 can allow the detection-distance change circuit 16 to change the detection distances to the obstacle 21. The obstacle detection apparatus 10 can also accurately inform the person in the vehicle of the distance to the obstacle 21 without changing the maximum detection distance even if there is the distance difference α between the distance from the sensor section 7 to the obstacle 21 and the distance from the rearmost part of the vehicle 1 to the obstacle 21 such as a case where the openable/closable body open. Therefore, the obstacle detection apparatus 10 does not give awkward feeling to the person in the vehicle.

The detection-distance change circuit 16 is switched over in conjunction with opening and closing of the openable/closable body provided at the rear portion of the vehicle 1. The detection-distance change circuit 16 can appropriately change the detection distances even if the person in the vehicle forgets to switch over the switch 19 mainly when the difference a between the distance from the sensor section 7 to the obstacle 21 temporarily differs from the distance from the rearmost part of the vehicle 1 to the obstacle 21 such as a case where the person in the vehicle backs up the vehicle 1 with the tailgate 4 open at the time of loading and unloading a load. This results in an accurate and certain informing of the distance to the obstacle 21.

The detection-distance change circuit 16 changes the detection distances L2 and L3 in accordance with the difference between the distance from the sensor section 7 to the obstacle 21 and the distance from the rearmost part of the vehicle 1 to the obstacle 21. Accordingly, the distance from the rearmost part of the vehicle 1 to the obstacle 21 can be accurately measured, and the person in the vehicle can be informed of that distance, thereby improving the ease of driving by the person in the vehicle.

The obstacle detection apparatus 10 has the alarm means 20 for giving an alarm step by step in accordance with the detection distance. Accordingly, the person in the vehicle can sensuously come to know the distance from the rearmost part of the vehicle 1 to the obstacle 21 just listing to that alarm, and can effectively avoid the obstacle 21.

The invention is not limited to the embodiment, and can be modified and changed in various forms within the scope of the invention.

What is claimed is:

1. An obstacle detection apparatus for detecting an obstacle to a vehicle, comprising:
   a sensor section provided at a rear portion of said vehicle including a transmitter which transmits a wave to a predetermined detection area, and a receiver which receives an echo of said wave reflected by said obstacle;
   a detection section which detects presence of the obstacle from an output of said sensor section; and
   a detection-distance change section which changes a predetermined detection distance within a maximum detection distance,
   wherein said detection-distance change section adds to said detection distance a difference between a distance from the sensor section to the obstacle and a distance from the rearmost part of the vehicle to the obstacle, when an openable/closable body provided at the rear portion of said vehicle is opened, without changing said maximum detection distance.

2. The obstacle detection apparatus according to claim 1, further comprising alarm means for giving an alarm step by step in accordance with said detection distance.

3. The obstacle detection apparatus according to claim 1, wherein said detection-distance change section is turned on/off by a first switch which is operated by a person in said vehicle.

4. The obstacle detection apparatus according to claim 1, wherein said detection-distance change section adjusts said detection distance as a person in said vehicle operates an adjust knob.

5. The obstacle detection apparatus according to claim 1, wherein said detection-distance change section changes said detection distance upon shift of a shift lever to a reverse range.

* * * * *